H. G. MARTIN.
SPRING WHEEL.
APPLICATION FILED JUNE 28, 1915.
1,200,429.
Patented Oct. 3, 1916.
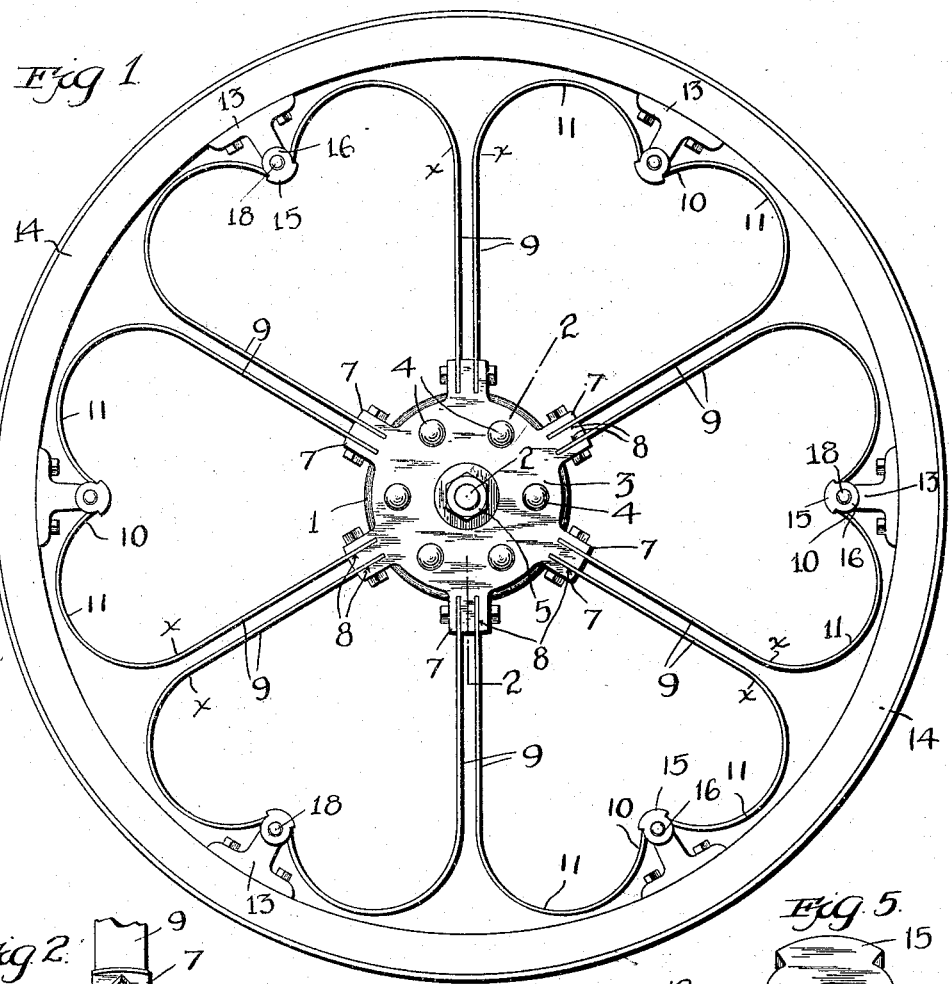
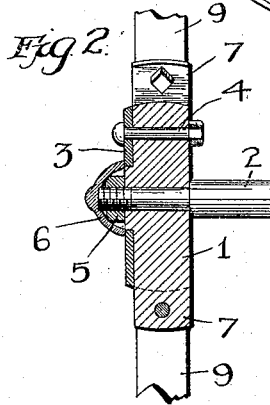
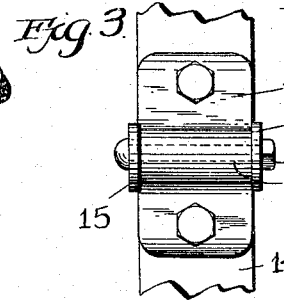
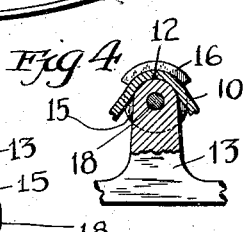
WITNESSES
INVENTOR
Harry G. Martin
BY
ATTORNEY

UNITED STATES PATENT OFFICE.

HARRY G. MARTIN, OF BROCKTON, MASSACHUSETTS, ASSIGNOR OF ONE-THIRD TO JESSE A. CASE, OF BROCKTON, MASSACHUSETTS, AND ONE-THIRD TO HARRY D. LINCOLN, OF ATTLEBORO, MASSACHUSETTS.

SPRING-WHEEL.

1,200,429.     Specification of Letters Patent.     Patented Oct. 3, 1916.

Application filed June 28, 1915. Serial No. 36,891.

*To all whom it may concern:*

Be it known that I, HARRY G. MARTIN, a citizen of the United States, residing at Brockton, in the county of Plymouth and State of Massachusetts, have invented new and useful Improvements in Spring-Wheels, of which the following is a specification.

This invention relates to spring wheels for use on vehicles, and has for its main object to provide a wheel that is resilient and simple in construction, effective in operation, and durable in use.

Other objects of the invention are hereinafter mentioned in connection with the several features comprising my invention. Those objects are accomplished by the means hereinafter described, and illustrated in the accompanying drawings, embodying a preferred form of my invention.

In the drawings, in which similar characters of reference indicate corresponding parts throughout the several views, Figure 1 is a side elevation of a vehicle wheel embodying my invention. Fig. 2 is a vertical section taken on the line 2—2 of Fig. 1. Fig. 3 is a plan of a bearing block attached to a wheel rim. Fig. 4 is a vertical section, partly broken away of some of the details of my invention, and Fig. 5 is a perspective view of one end of a clip.

As illustrated in the drawings, 1 represents a hub provided with a suitable aperture to engage an axle 2. It is not essential, however, that the hub be mounted directly on an axle. The hub 1 may be provided, if desired, with a plate 3, secured to the main hub 1, by means of bolts 4. In the construction shown, the hub is secured to the axle by means of a nut 5, which may be concealed by a cap 6, if desired. The special construction of the hub however, forms no essential part of my invention.

The hub 1 is provided with lugs 7 extending radially therefrom, and those lugs are provided with slots 8 or other suitable means adapted to receive the ends of spokes 9. The lugs 7 are preferably arranged in pairs, so that two spokes 9 may be arranged close enough together to aid and strengthen each other.

The spokes 9 are designed to be substantially rigid so as to sustain a vertical or torsional strain. The outer portion of the spokes merge into a bow shaped spring at the parts X, two spokes being used with each spring.

This spring is made bow-shaped by bending its central portion 10 inwardly making two oppositely disposed loops 11. The spring is preferably made of thinner material than the spokes 9 by reducing the thickness of the metal forming the bow, so as to provide the desired amount of flexibility in the spring.

The central portion 10 of the bow spring is mounted upon and bears against the upper end 12 of a bearing block 13, the block being secured to the rim 14 of the wheel. The upper end of the bearing block is rounded and serves as a saddle for the bow spring, and forms a firm, even bearing that is not disturbed by any strain to which a wheel of the character shown is subjected. The central portion of the spring is secured in place in the bearing block, by means of a clip 15, having offset lugs 16 provided with an aperture 17 through which, and a corresponding transverse aperture formed in the bearing block, a bolt 18 extends, and clamps the bow spring onto the bearing block without making any aperture in the spring itself or otherwise weakening the spring. While it is not essential, I prefer to make the curve of the upper part of the bearing block extend in the arc of a circle or approximately thereto, so as to obtain an even bearing on the top of the bearing block without interfering with the function performed by the loop portions of the spring.

By means of the foregoing elements, a wheel is provided sufficiently flexible for many purposes and with a minimum number of parts, so constructed and arranged as to provide a strong wheel adapted to be subjected to, and withstand the strains and uses to which devices of the character of that shown and described herein are usually subjected. In addition thereto, the parts are so constructed that in case of necessity for so doing, one of the springs may be readily detached from the wheel and a new spring inserted by the user. The rim of the wheel may be provided with a hard rubber, or soft rubber tire, or a tire of any other suitable character. That feature forms no essential part of my invention.

What I claim and desire to secure by Letters Patent is:

In a spring vehicle wheel, the combination of a hub, a rim, a plurality of bearing blocks secured to said rim and provided respectively with a rounded bearing surface, a plurality of pairs of radial spokes, each pair merging at their outer portions into a spring, thinner in cross section than said spokes, depressed inwardly at its central portion to form a bearing surface and spring loops on opposite sides thereof extending below said bearing surface, and a plurality of clips each having a rounded bearing surface and provided with off-set lugs, and with means for securing said lugs to said bearing blocks independently of said spring.

HARRY G. MARTIN.

Witnesses:
 EMIL R. STEELE,
 A. A. DAY.

Copies of this patent may be obtained for five cents each, by addressing the "Commissioner of Patents, Washington, D. C."